United States Patent [19]

Mang

[11] Patent Number: 4,590,535
[45] Date of Patent: May 20, 1986

[54] STATIC CHARGE DISSIPATION CIRCUIT WITH ELECTROCONDUCTIVE WICKS

[75] Inventor: Raymond L. Mang, Huntsville, Ala.

[73] Assignee: PPG Industries, Inc., Pittsburgh, Pa.

[21] Appl. No.: 464,088

[22] Filed: Feb. 4, 1983

[51] Int. Cl.⁴ .............................................. H05F 3/02
[52] U.S. Cl. .................................... 361/218; 361/216; 244/1 A
[58] Field of Search ................ 361/218, 212, 217, 222, 361/213, 216; 219/203, 522, 547; 428/38, 922; 244/1 A, 134 D

[56] References Cited

U.S. PATENT DOCUMENTS

| | | | |
|---|---|---|---|
| 2,416,202 | 2/1947 | Naumann | 175/264 |
| 2,456,373 | 12/1948 | Campaigne | 175/264 |
| 2,457,299 | 12/1948 | Biemesderfer, Jr. | 175/264 |
| 3,386,001 | 5/1968 | Slosberg et al. | 317/2 |
| 3,721,595 | 3/1973 | Tarnopol et al. | 156/89 |
| 3,740,281 | 6/1973 | Fujiwara | 156/99 |
| 3,755,713 | 8/1973 | Paszkowski | 317/2 E |
| 3,895,433 | 7/1975 | Gruss | 29/611 |
| 4,057,671 | 11/1977 | Shoop | 219/203 X |
| 4,078,107 | 3/1978 | Bitterice et al. | 428/38 |
| 4,128,448 | 12/1978 | Bitterice et al. | 156/166 |
| 4,323,946 | 4/1982 | Traux | 361/218 |

Primary Examiner—Reinhard J. Eisenzopf
Attorney, Agent, or Firm—Andrew C. Siminerio; Donald Carl Lepiane; Rita M. Irani

[57] ABSTRACT

A device for dissipating static charge collected on the surface of a laminated aircraft window having an outboard plastic ply includes a plurality of electroconductive static charge collecting wicks extending through the thickness of the outboard ply from the outboard surface of the ply to its inboard surface where the wicks are interconnected by wire runs adapted for connection to ground. The device may be laminated to additional transparent structural plies to form a composite aircraft transparency. The device is advantageously used to protect heating facilities in a composite transparency from static discharge damage, as well as to prevent damage to the plies of the transparency from static discharge through the plies.

15 Claims, 5 Drawing Figures

STATIC CHARGE DISSIPATION CIRCUIT WITH ELECTROCONDUCTIVE WICKS

BACKGROUND OF THE INVENTION

1. Cross Reference to Related Applications

Copending, commonly assigned U.S. patent application Ser. No. 464,090 to Gary M. Cribbs, filed even date, and now abandoned, entitled "Method and Apparatus For Inserting An Electrically Insulated Anti-Static Circuit in a Thermoplastic Substrate" may be used in the practice of the instant invention, and the teachings thereof are hereby incorporated by reference.

2. Field of the Invention

This invention relates to a device for dissipating static charge from a substrate surface, and in particular, for preventing substantial static charge build-up on the outboard surface of a laminated aircraft window.

3. Discussion of the Technical Problem and Presently Available Techniques

Windows used in aircraft typically include several glass and/or plastic layers or plys which are fused or laminated together to form a composite transparent window. As used herein, the term composite ply, transparency, or window refers to a substrate containing more than one layer of glass or plastic or a combination of glass and plastic. In order to remove fog, mist or ice which deposits on the outside or outboard surface of the window during flight, the aircraft windows may include an internally located electrical device for heating the window. In addition to fog or ice, static electric charge also collects on the outboard surface of an aircraft window during flight. If allowed to build up, the static charge reaches an electric potential sufficient to discharge through the window to the interior heating device.

This electrical discharge often punctures small holes in the window. In extreme cases, depending on the dielectric strength of the window material, a relatively high voltage discharge can result in sufficient localized heat to severely damage the window in the vicinity of the discharge path. Further, when the discharge is through the heating device, the device can be severely damaged. It is therefore necessary to provide some facility for dissipating static charge before it reaches an electric potential sufficient to discharge through the window.

A method for preventing static charge build-up on the outboard surface of an aircraft window is to coat the outboard window surface with an electroconductive anti-static coating. Transparent electroconductive coatings of metal or metal oxide materials of suitable electroconductivity have been successfully applied to glass plys to provide an outboard anti-static coating. Typically, such coatings are applied to glass by pyrolysis of metal salts or by cathode sputtering, both of which require relatively high temperatures to yield coatings of sufficient durability. However, even though such coatings work well on glass, they are not readily usable on plastic because the high temperatures required for successful deposition of these coatings would result in deformation and consequent optical and structural distortion of presently available plastics.

As can be appreciated, plastics are used in the construction of aircraft windows because of their low density and consequent light weight. This light weight is particularly important in small aircraft where weight of the windows is significant relative to the overall weight of the aircraft. Presently available anti-static coatings which can be applied at temperatures suitable for plastic plys do not provide in service the necessary combination of optical transparency, electroconductivity and durability.

Further, anti-static coatings have additional drawbacks when used on plastic surfaces in that plastics are more likely than glass to develop scratches and other mars which interfere with visibility. Consequently, windows having an outboard plastic ply must be polished periodically to restore their smooth transparent surface. This polishing can eventually remove any coating applied to the outboard surface of a window. For this reason, an alternative to anti-static coatings is preferable for plastic aircraft windows.

U.S. Pat. No. 4,078,107 to Bitterice et al., hereby incorporated by reference, teaches a lightweight aircraft window having a heating circuit embedded the full depth of the outboard plastic ply, and an anti-static circuit embedded just beneath the outboard surface of the window. The Bitterice et al. anti-static circuit provides an electrically conductive path parallel to the outboard surface of the window for dissipation of static charge before the charge reaches a level sufficient to cause electrical discharge from the outboard surface of the transparency to the interior heating circuit. Although the Bitterice et al. circuit successfully dissipates static charge, thereby preventing damage to the heating circuit, it has limitations. For example, the Bitterice et al. circuit includes thin static charge dissipating wires parallel to the outboard surface of the window and covered with a plastic overlayer less than 5 mils (0.13 mm.) thick. Because the charge collected on the window surface must travel through the plastic overlayer to reach the dissipating wires, the charge can still create small holes or punctures therein. As can be appreciated, it would be desirable to eliminate puncturing of the plastic overlayer. Further, repeated polishing of the plastic overlayer to remove dirt and scratches may eventually wear it away, thereby exposing portions of and/or breaking the dissipating wires resulting in loss of effective charge dissipation.

Aircraft windows which are bent to conform to the aerodynamic shape of the aircraft involve a further limitation of the Bitterice et al. technique. Bending the plastic laminate having longitudinal wires close to its outboard surface may cause portions of the wire to escape through the thin plastic overlayer during the bending process, leaving these escaped portions exposed to breakage.

It is therefore desirable to have techniques for effectively dissipating static charge from the surface of nonconductive substrates which do not have the drawbacks or limitations of the presently available techniques.

SUMMARY OF THE INVENTION

This invention relates to a device for dissipating static electric charge collected on the surface of a nonconductive substrate, e.g., an outboard plastic ply of a composite aircraft window or transparency. The device includes electroconductive elements, e.g., wire wicks, extending through the outboard ply from a point adjacent its outboard surface to its opposite surface where the elements are interconnected by spaced, e.g., about ½ to 4½ inches (1.27 to 11.4 cm.), wire runs suitably adapted for connection to ground.

The invention also relates to the use of the dissipating device in a composite aircraft transparency which includes facilities for electrically heating the transparency.

The invention further relates to a method of dissipating static charge accumulated on the surface of a nonconductive substrate including conducting charge through the thickness of the substrate from one major surface of the substrate along conductive elements inserted in the substrate. These elements dissipate the static charge to ground along a path adjacent a second opposite major surface of the substrate.

The present invention avoids the problems previously discussed by providing an anti-static circuit for use in a plastic substrate having static charge dissipation wires embedded within the transparency, e.g. plastic outboard ply, at a depth equal to at least the thickness of the outboard ply with static charge collecting wicks extending through the thickness of the ply to provide small static charge collection points exposed at the outboard surface of the transparency. With this arrangement, when the outboard exposed wick tips are broken or worn away, new portions of the wick, i.e., new wick tips, are exposed to maintain the integrity of the electrical conductivity of the entire anti-static circuit. Furthermore, the remaining length of each wick is conveniently encased in the surrounding plastic which serves to structurally support the wick, thereby minimizing the chance that embedded portions of the wick will be broken during bending or in service thus substantially preventing the loss of electrical conductivity in any individual wick.

DETAILED DESCRIPTION OF THE INVENTION

Figure 1:
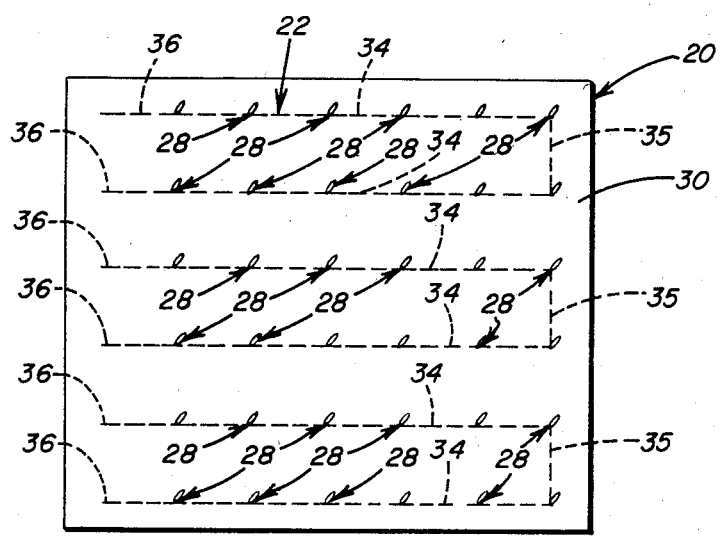
FIG. 1 is a plan view of a transparent substrate having an anti-static circuit constructed in accordance with the teachings of the invention.
Figure 2:
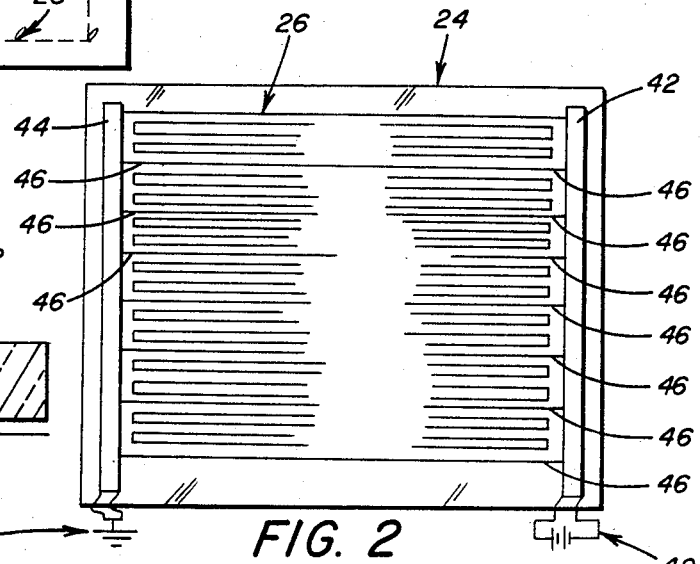
FIG. 2 is a plan view of a transparent substrate having an electrical heating circuit which may be used in the practice of the invention.

Shown in FIG. 1 is a first ply, e.g., a transparent outboard plastic ply 20, having a static charge dissipation or anti-static circuit 22 incorporating features of the invention. Shown in FIG. 2 is a second ply, e.g., a transparent inboard ply 24 having a heating circuit 26, which may be conveniently fused or laminated to the outboard ply 20 to form a composite transparency 27 shown in FIG. 4 before lamination, and in FIG. 5 prior to complete lamination.

Figure 3:
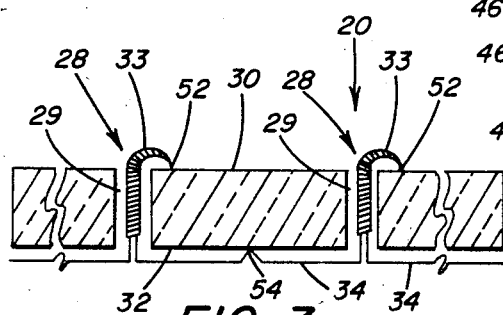
FIG. 3 is a fragmented, cross-sectional, side elevated view of the anti-static circuit of FIG. 1 showing spaced interconnected wicks.

With reference to FIGS. 1 and 3 as required, the outboard ply 20 may be any nonconductive substrate, e.g., a rigid transparent sheet of plastic such as acrylic, polycarbonate, polyester or hard polyurethane. The ply 20 has a plurality of spaced electroconductive elements, e.g. wire wicks 28, conveniently inserted in the ply 20, e.g. in passageways 29, for electrically interconnecting outboard surface 30 and inboard surface 32 of the ply 20. Adjacent the outboard surface 30, the wicks 28 terminate in wick tips 33 (shown in FIG. 3). Adjacent the inboard surface 32, selected ones of the wicks 28 are electrically interconnected by longitudinal wire runs 34, with pairs of adjacent runs 34 interconnected by transverse wire runs 35, as shown in FIG. 1. Free ends 36 of the runs 34 are connected in any convenient manner to a suitable ground to form the anti-static circuit 22.

It is understood that wire wicks are not limiting to the invention and that any electroconductive material, e.g., compressed carbon or graphite, may be inserted in the passageways 29 for interconnecting the surfaces 30 and 32 to conduct charge through the thickness of the ply 20. Further, when the wicks 28 are constructed of a pair of wires, the wires may be twisted around one another as shown in FIG. 3 to assure electrical contact throughout their lengths.

With specific reference to FIG. 3, and as will be more fully appreciated in light of the discussion which follows, the wick tips 33 extend beyond the surface 30 only for convenience in assembling the circuit. For the purpose of preventing static charge from puncturing the ply 20, however, it is preferred that the wick tips 33 extend at least close to the outboard surface 30. In this manner, static charge accumulated on the outboard surface 30 is provided with a controlled conductive path to carry the charge away from the surface 30 and through the ply 20 for dissipation to ground, thereby preventing the surface charge from reaching an electric potential sufficiently large to spontaneously discharge through the ply 20. Although not limiting to the invention, it has been found that spacing adjacent wire wicks 28 about 2 to 4½ inches (about 5.08 to 11.4 cm.) apart provides an adequate number of collection points or wick tips 33, to assure adequate dissipation of static charge voltages accumulated on the surface of aircraft windows under usual operating conditions. As can be appreciated, the optimal spacing of the wicks for an aircraft window depends on additional factors such as acceptable electrical noise levels compatible with the electronic devices in the aircraft itself, e.g. the control panel devices. It has been found that closer spacing of the wicks produces less electrical noise; however, wider spacing involves lower production costs.

Dissipation of the static charge to ground is accomplished in any convenient manner, e.g. by interconnecting the wicks 28 by the runs 34 and 35, as previously discussed, adjacent the inboard surface 32 of the ply 20. Although not limiting to the invention, it is preferred that the wicks 28 be interconnected in a pattern similar to that shown in FIG. 1. More particularly, the longitudinal wire runs 34 interconnecting adjacent wicks are parallel to one another and alternate pairs of runs 34 are interconnected by the transverse wire runs 35. The free ends 36 of the longitudinal wire runs 34 provide a ground connection. With this arrangement, the number of wire runs 34 parallel to the inboard surface 32 of the substrate 20 is minimized, thereby keeping the visibility through the transparency at an optimal level. Furthermore, with this arrangement, the anti-static circuit 22 remains operative even if a discontinuity in one of the runs occurs. More particularly, each pair of adjacent longitudinal wire runs 34 is interconnected by the transverse wire run 35 and has a free end 36 connected to a common ground to dissipate static charge to ground along its length in either direction. As can be appreciated, in this manner, a single discontinuity in any of the independent circuit portions will not prevent collected charge from being dissipated to ground, but will simply cause the charge collected by wicks adjacent the discontinuity to travel in opposite directions to the adjacent free end 36. Further, a more serious discontinuity in one of the independent circuit portions, e.g. two breaks in the wire runs 34 and/or the transverse wires 35, will not prevent static charge dissipation in the remaining independent circuit portions.

As can now be appreciated, however, this pattern of interconnecting the wicks 28 by wire runs 34 and 35 is not limiting to the invention in that adequate static charge dissipation is accomplished by electrically connecting the wicks 28 to ground in any convenient manner. For example, the transverse wire runs 35 may be eliminated as shown in FIG. 1 of the above-referenced Cribbs application.

As practiced, tungsten wire having a diameter of about 0.7 mils (0.017 mm.) was used for the wicks 28, the wire runs 34 and the transverse wires 35. Holes were drilled in the outboard ply to create the passageways 29. The wicks 28 were inserted by pulling a looped portion of wire through from the inboard surface 32 to the outboard surface 30 of the outboard ply 20 at each of the passageways 29, with the closed end of the loop, e.g. the wick tip 33, slightly extending beyond the outboard surface 30 for convenience in securing the wick tip 33 thereto, as discussed below. The remaining wire portions of the anti-static circuit 22 were single strands of wire interconnecting the free ends of the wire loops. The wick tips 33 and the longitudinal wire runs 34 were temporarily secured in position by heat tacking, i.e. a heated soldering iron was conveniently touched to a portion of wire adjacent a surface of the ply 20 to briefly soften the plastic surface causing it to flow over the wire and adhere to it upon cooling. With reference to FIG. 3, the wick tip 33 is shown tacked to the outboard surface 30 at 52 and the wire run 34 is shown tacked to the inboard surface 32 at 54.

Although not limiting to the invention, the anti-static circuit 22 may be advantageously used in a composite transparency which includes facilities for electrically heating the transparency. For example, there is shown in FIG. 2 the heating circuit 26 which includes energizing bus bar 42 and ground bus bar 44 for electrically interconnecting closely spaced wire heating elements 46 which heat the transparency to remove fog and ice from an aircraft window. The bus bar 42 is connected to facilities, e.g. a power source 49, for energizing the wire elements 46, and the ground bus bar 44 is connected to ground 55. The heating circuit 26 is similar to that taught in U.S. Pat. No. 4,078,107 to Bitterice et al., which teachings are hereby incorporated by reference, the bus bars 42 and 44 each having two metallic layers for sandwiching end portions of the heating elements 46 therebetween (see FIG. 5).

Figure 4:
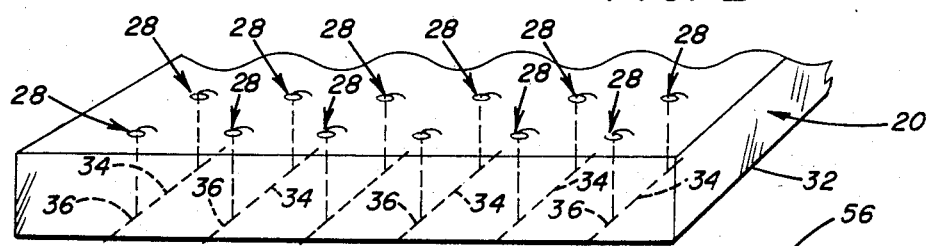
FIG. 4 is a fragmented perspective view of the substrates shown in FIGS. 1 and 2 in spaced alignment prior to fusion or lamination of the substrates to form a composite transparency, e.g. an aircraft window.

With reference to FIG. 4, the outboard ply 20 containing the anti-static circuit 22 is shown, for purposes of illustration, in spaced relation to the inboard ply 24 in a preferred alignment. In particular, the plys 20 and 24 are aligned such that the longitudinal wire runs 34 and the heating elements 46 are substantially parallel to one another to minimize the effect of the circuits 22 and 26 on optical transparency.

To insure effective fog and ice removal from the outboard surface 30, the heating circuit 26 should be as close to the outboard surface 30 as possible. For this reason, it is preferred that face 56 of the ply 24 having the heating circuit thereon overlies the inboard surface 32 of the ply 20 having the wire runs 34 and 35 thereon. This orientation requires that the anti-static circuit 22 be electrically isolated from the heating circuit 26 to prevent static charge collected by the anti-static circuit 22 from shorting the heating circuit 26.

Figure 5:
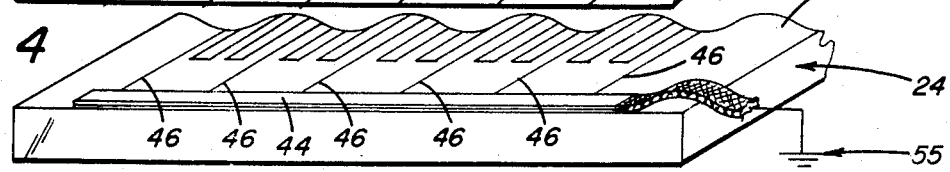
FIG. 5 is a fragmented, cross-sectional, side elevated view of a composite transparency formed by laminating or fusing the substrates aligned as shown in FIG. 4.
Figure 5:
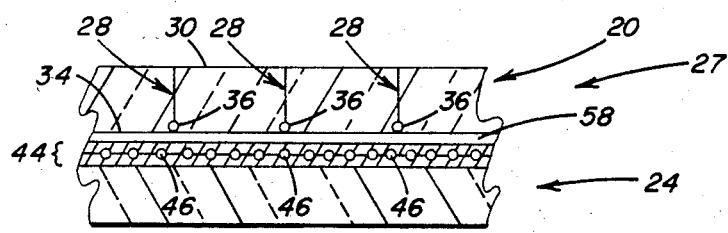

Electrical isolation between the wires of the anti-static and heating circuits may be accomplished by inserting a nonconducting layer 58, shown in FIG. 5 only, between the plies 20 and 24. The layer 58 should be as thin as possible for effective heat transfer from the heating elements 46 to the outboard surface 30 while of sufficient structural strength to prevent the wire runs 34 or 38 and the heating elements 46 from penetrating the layer 58 during assembly and lamination.

For the purpose of clarity in showing the relationship of elements in the composite ply 27, FIG. 5 shows the anti-static circuit wire runs 34 and 35 at the interface of the ply 20 and the layer 58 and the heating elements 46 at the layer 58-ply 24 interface, i.e. the composite ply 27 before complete lamination. As can be appreciated, after complete lamination, there would not be distinct interfaces between the plys, and the laminate would flow between the wires. If a single ground connection for the composite outboard ply 27 is desired, e.g., for ease of window construction and installation, the free ends 36 of the anti-static circuit may be either individually or collectively routed through the layer 58 to be electrically connected to the ground bus bar 44 of the heating circuit. Alternatively, the anti-static circuit 22 may be grounded separately from the heating circuit.

When the layer 58 is used, the wires need not be insulated. When the wires are insulated, the layer 58 can be omitted, as taught in U.S. patent application Ser. No. 464,090 of G. M. Cribbs, filed even date, entitled "Method and Apparatus For Inserting An Electrically Insulated Anti-Static Circuit In A Thermoplastic Substrate", the teachings of which are hereby incorporated by reference. As taught therein, the anti-static circuit 22 is constructed using insulation coated wires. The free ends 36 of the longitudinal runs 34 may be positioned to overlie the ground bus bar 44 as shown in FIG. 4, facilitating electrical connection of the anti-static circuit to the ground bus bar 44.

With the outboard ply 20 overlying the inboard ply 24, as illustrated in FIG. 4, and having a nonconducting layer 58 therebetween, the assembly of plies is conveniently fused, e.g. as taught in U.S. Pat. No. 4,078,107 at page 10, line 65–page 11, line 30, or laminated as described in the same patent at page 11, line 53–page 12, line 3, to form the composite outboard ply 27 (see FIG. 5) having both the anti-static circuit 22 and the heating circuit 26. The process of fusing or laminating the plies further serves to substantially close the wick passageways 29 thereby securing or embedding the wicks 28 in the composite ply 27.

The composite ply 27 is a self-contained heating and anti-static transparency suitable for use as an outboard ply for a composite aircraft transparency. The composite ply 27 may be further laminated to additional structural plies and provided with a suitable frame to form a transparent aircraft window including the heating circuit 26 for removing fog or ice, as well as the anti-static circuit 22 for removing static electric charge from the window's outboard surface, e.g. the surface 30 of the ply 20. Having the longitudinal wire runs 34 embedded the depth or thickness of the outboard ply 20 prevents repeated polishing and/or erosion of the outboard surface 30 from damaging the anti-static circuit 22 and allows subsequent bending of the composite ply 27 without significant risk of damage to the circuits 22 and 26.

It is understood that the particular configuration of wires in the anti-static circuit is not limiting to the invention, nor is the use of loops of wire for the wick, and further that the anti-static circuit may be grounded directly to any suitable ground of the aircraft instead of to a bus bar element of the heating circuit. In addition, wire wicks need not be twisted and may be one or more parallel wires being individually or jointly electrically connected to the wire runs. Further modifications of the invention, as will be apparent to one skilled in the art, can be made without departing from the spirit of the invention, the scope of which is defined by the claims which follow.

What is claimed is:

1. A device for dissipating static charge comprising:
    a substrate having a first surface and a second opposite surface;
    a plurality of electroconductive members mounted in said substrate for electrically interconnecting said first surface and said second surface, each of said members defined by at least two electroconductive filaments between said first and second surfaces of said substrate and having an end portion adjacent said second surface; and
    a plurality of electroconductive wires electrically connecting said end portions of selected members to one another to form a plurality of individual electroconductive member and electroconductive wire assemblies, said wires having a first end and a second end wherein said first end is to be grounded.

2. The device as in claim 1, wherein each of said members includes at least one loop of wire having a closed end adjacent said first surface and an open end accessible for connection with said electroconductive wires.

3. The device as set forth in claim 2, wherein said plurality of members is arranged in rows and columns.

4. The device as set forth in claim 3 wherein said electroconductive wire includes a longitudinal wire run for interconnecting the electroconductive members in a row, and further including a transverse wire run electrically connecting each of the second ends of alternate and adjacent longitudinal wire runs so as to have a plurality of individual conductive paths of at least two longitudinal wire runs and wherein said first ends of said wire runs are to be grounded.

5. The device as set forth in claim 4, wherein said substrate is transparent.

6. The device as set forth in claim 5, wherein said members pass through the thickness of said substrate and said members are secured therein.

7. The device as set forth in claim 6, wherein said members in said rows and said columns are spaced between about ½ inch (1.27 cm) and about 4½ inches (11.4 cm) apart.

8. The device as set forth in claim 7, wherein said members in said rows and said columns are spaced about 3 inches (7.62 cm) apart.

9. The device as set forth in claim 1 wherein said substrate is a first substrate and further including:
    a second substrate with a first major surface secured to said second surface of said first substrate;
    means for electrically heating one of said substrates said heating means mounted on said first major surface of said second substrate wherein said first substrate is secured to and overlies said second substrate with a portion of said heating means between said second surface of said first substrate and said first surface of said second substrate; and further including:
    means for electrically insulating said electroconductive member and electroconductive wire assemblies from said heating means.

10. The device as set forth in claim 9, wherein said electrically insulating means includes a nonconductive substrate interposed between said second surface of said first substrate and said first surface of said second substrate.

11. The device as set forth in claim 10, wherein said first and said second substrates are transparent substrates and further including one or more additional transparent substrates secured to a second major surface of said second substrate to form a composite transparency suitable for an aircraft window.

12. A method of providing a nonconductive substrate with means for dissipating static electric charge comprising the steps of:
    providing a plurality of spaced wire members, through the thickness of the substrate to electrically interconnect a first surface of the substrate with a second surface of the substrate each of said wire members having at least two electroconductive filaments;
    electrically interconnecting selected members with one another adjacent said second surface of said substrate so as to form a plurality of individual interconnected wire member assemblies; and
    grounding each of said interconnected wire member assemblies whereby charged collected on each of said assemblies moves through the assembly to ground.

13. The method as set forth in claim 12, wherein the substrate is transparent and said providing step includes providing said wire members at a spacing of between about ½ inch (1.27 cm) and about 4½ inches (11.4 cm).

14. The method as set forth in claim 13, wherein said providing step includes providing said wire members at a spacing of about 3 inches (7.62 cm).

15. The method as set forth in claim 14, wherein said providing step includes providing a plurality of spaced loops of wire each having a closed end adjacent said first surface and an open end accessible from said second surface for said selectively interconnecting step.

* * * * *